Aug. 10, 1948.    H. W. DENHARD ET AL    2,446,746
CONTINUOUS ROTARY FILTER

Original Filed Dec. 11, 1943    2 Sheets-Sheet 1

INVENTORS
HARRY W. DENHARD
FRANK W. BRITTAIN
ANTHONY G. SERPAS
BY
ATTORNEYS

Aug. 10, 1948.   H. W. DENHARD ET AL   2,446,746
CONTINUOUS ROTARY FILTER
Original Filed Dec. 11, 1943   2 Sheets-Sheet 2
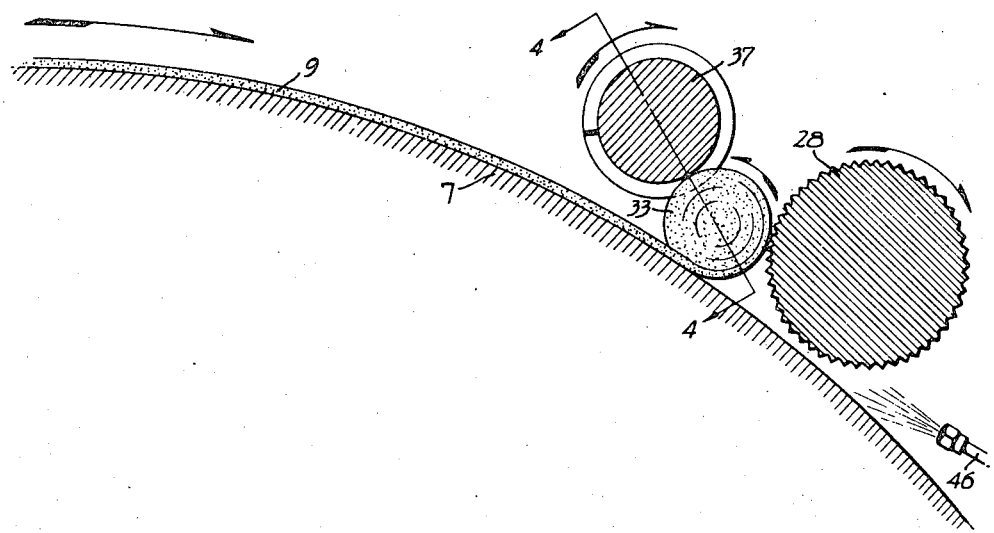
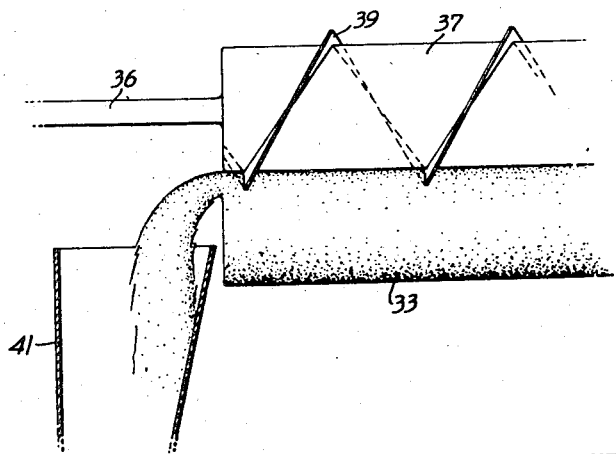
INVENTORS
HARRY W. DENHARD
FRANK W. BRITTAIN
ANTHONY G. SERPAS
BY
ATTORNEYS Patented Aug. 10, 1948

2,446,746

UNITED STATES PATENT OFFICE 2,446,746

CONTINUOUS ROTARY FILTER

Harry W. Denhard, Sebastopol, Frank W. Brittain, Piedmont, and Anthony G. Serpas, Oakland, Calif., assignors to Oliver United Filters Incorporated, Oakland, Calif., a corporation of Nevada Continuation of application Serial No. 513,958, December 11, 1943. This application February 16, 1948, Serial No. 8,673

3 Claims. (Cl. 210—201)

This invention relates in general to continuous rotary filters, and more particularly to a scroll discharge for discharging the cake formed and carried on such filters, and this application is a continuation of our application Serial No. 513,958 filed December 11, 1943, for "Continuous rotary drum filters," now abandoned.

There are now in current use various types of discharging devices such as doctors or scrapers; couch rolls; discharge rolls such as exemplified in the Gardella Patent No. 1,812,648; vacuum dischargers such as exemplified in the Hillier Patent No. 1,914,742; and the Hydrair discharger such as exemplified in the Young Patent No. 2,070,074. While each of these types of dischargers is effective in discharging certain types of cakes, none of them is effective in discharging relatively thin, low density cakes such as are sometimes encountered in filtering ground wood paper pulp.

In general, the object of this invention is the provision of a scroll discharger, particularly designed for discharging relatively thin, low density paper pulp and similar materials from continuous rotary drum filters.

More particularly, the object of the invention is the provision in a rotary drum filter of a discharge roll mounted across the face and immediately adjacent to the drum of the filter, for rotation in the same clockwise direction as the filter drum, in combination with a screw conveyor or discharge scroll mounted over the drum and to the rear of the discharge roll, for rotation also in the same clockwise direction as the filter drum, the function of the discharge roll being to cause the cake or sheet carried on the filter drum continuously to roll up upon itself, and the function of the screw conveyor or discharge scroll being continuously to take a cut from the roll of solids and continuously to advance said cut laterally to one or both ends of the filter drum.

A further object of the invention is the provision of means for delivering a fluid current between the filter drum and the discharge roll, for the purpose of aiding the discharge roll in causing the cake to roll up upon itself and for controlling the density of the cake at this point.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 3 is an enlarged section taken on the line 3—3 of Fig. 2, diagrammatically illustrating the discharge mechanism constituting the objects of our invention.

Fig. 4 is an enlarged section taken on the line 4—4 of Fig. 3, showing the operation of the screw conveyor or discharge scroll in advancing the roll of pulp or slurry to one end of the filter drum.

Figure 1:
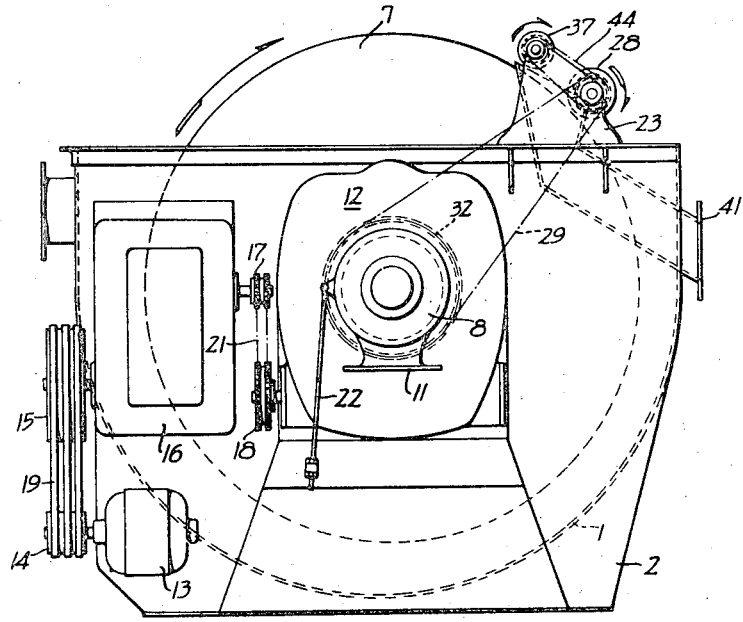
Fig. 1 is an elevation of the valve end of a continuous rotary drum filter embodying the objects of our invention.
Figure 2:
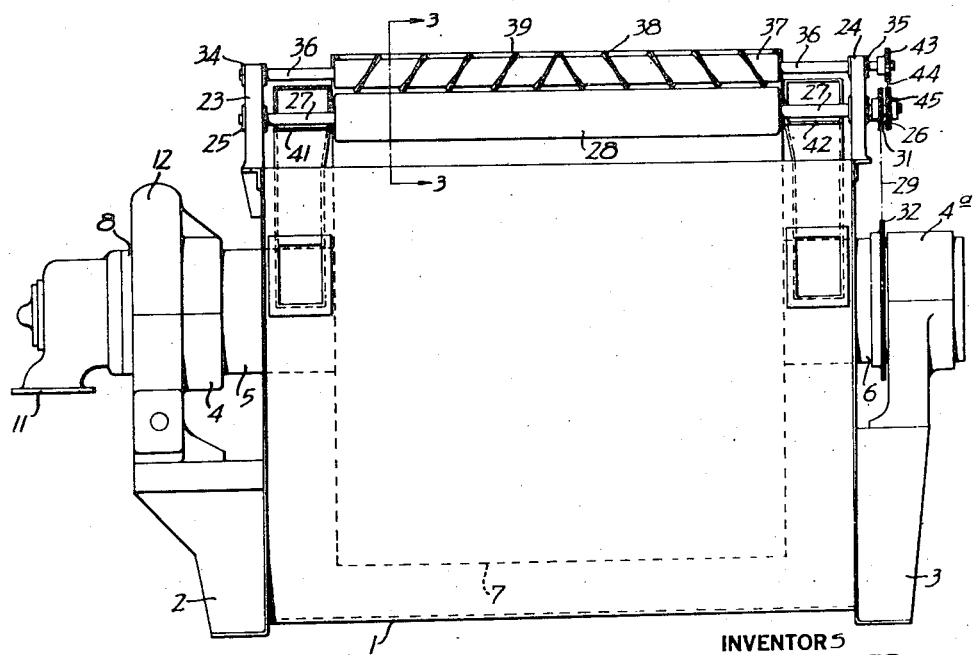
Fig. 2 is a side elevation of the filter shown in Fig. 1.

As shown in Figs. 1 and 2, our discharge mechanism has been illustrated as applied to a conventional continuous rotary drum filter comprising a tank 1, supported at either end on pedestals 2 and 3. Mounted on the pedestals 2 and 3 respectively are bearings 4 and 4—A, in which are journaled trunnions 5 and 6. Carried by the trunnions 5 and 6 is a filter drum 7, the periphery of which is sectionalized so as to form the usual filtrate compartments, each filtrate compartment having communication through suitable piping extending within the drum, with an automatic valve 8 associated with the trunnion 5.

In accordance with standard practice, the pulp or slurry to be filtered is maintained at a constant level within the filter tank 1, and as each of the drum sections or filtrate compartments rotates through the body of pulp or slurry contained within the tank, a layer 9 of pulp or slurry (see Fig. 3) is deposited on the filter medium carried by the drum. This action is brought about through an inwardly directed differential filtering pressure, which also causes the filtrate to pass through the filter medium and out through the filtrate port 11 of the automatic valve 8. The drum 7 is driven through a suitable gear carried by the trunnion 5 and housed within the gear housing 12, and which in turn is driven by an electric motor 13 through suitable pulleys 14 and 15, a speed reducer contained within a housing 16, sprockets 17 and 18, belting 19 and a chain 21. For the purpose of adjusting the cycle of operation of the filter, the valve 8 may be advanced or retarded through a predetermined arc by means of an adjusting rod 22.

Mounted on the ends of the tank 1 adjacent to the descending side of the drum are opposed brackets 23 and 24. Journaled in bearings 25 and 26, mounted in the brackets 23 and 24, is a shaft 27, which carries a discharge roll 28 extending across the face of the filter drum 1 and immediately adjacent thereto. The shaft 27 and discharge roll 28 are driven in the same clockwise direction as the filter drum 1 by a chain 29 operatively associated with a sprocket wheel 31, secured to the shaft 27, and a sprocket wheel 32 secured to the drum trunnion 6. Assuming as shown in Fig. 1 that the filter drum 1 rotates in a clockwise direction, the discharge roll 28 should be driven in the same direction and at substantially the same peripheral speed. It is to be noted that although the filter drum 1 and the discharge roll 28 are rotating in the same clockwise direction, the adjacent peripheral surfaces of these two members are travelling in opposed directions, and consequently the discharge roll 28 should have positive clearance with respect to the filter drum. The function of the roll 28, as more clearly shown in Fig. 3, is to cause the on-coming layer or sheet 9 of solids to roll up upon itself into a cake roll 33.

Journaled in bearings 34 and 35, carried by the brackets 23 and 24, is a shaft 36 on which is mounted a double screw conveyor or discharger scroll 37. As more clearly shown in Fig. 3, the discharger scroll 37 is mounted above the filter drum 1, and to the rear of the discharge roll 28, so as to define with the discharge roll 28 and the filter drum, a trough for the accommodation of the cake roll 33. The scroll 37 (see Fig. 2) is formed with a right-hand screw 38, and a left-hand screw 39, its function, as indicated in Figs. 3 and 4, being to take a cut from the outer portion of the cake roll 33, and to advance said cut to both ends of the filter drum, where it is discharged respectively into chutes 41 and 42, supported respectively at either end of the tank 1. The use of a double screw conveyor is particularly desirable in connection with relatively long filters, although for small filters a screw conveyor operating in only one direction can be effectively used. The screw conveyor or scroll 37 is driven by a sprocket 43, keyed to the shaft 36, and operatively associated with a chain 44 and a sprocket 45 keyed to the end of the shaft 27. The speed of rotation of the screw conveyor 37, and the pitch of the screws 38 and 39 should be so correlated that the rate at which the solids are discharged is substantially equal to the rate at which these solids are formed on the filter drum.

For the purpose of aiding the discharge roll 28 in causing the initial formation of the cake roll 33, a plurality of spray nozzles 46 are mounted across the face of the filter drum 1 below the discharge roll 28, and are so directed as to deliver a fluid current (normally water) against the on-coming cake of solids, and between the filter drum 7 and the discharge roll 28. In addition to aiding the roll 28 in initially forming the cake roll 33, this fluid current serves to regulate the consistency of the cake roll 33, and also to clean the filter medium of any solid particles that may adhere thereto.

As with many other types of dischargers, the differential filtering pressure should be materially reduced or entirely eliminated adjacent to the point at which the cake roll 33 is formed, for otherwise the inwardly directed differential filtering pressure would tend to hinder the formation of the cake roll 33.

From the above description, it will be noted that in so far as the application of our discharger is concerned, the filter drum simply serves as an endless support or conveyor, and that the method by which the solids are deposited on the endless conveyor is immaterial.

To form a cake roll 33, there should be a greater cohesive force between the particles making up the cake than the adhesive force between the cake particles and the filter medium. The material of which the discharger roll 28 is made is of no particular significance so long as it is such that there is no substantial adherence between it and the cake. Viewed in one light, the cake roll 33 may be considered as a continuously formed self-couching roll, to which rotation is imparted by the discharger roll 28, and the diameter of which is maintained constant by the cutting action of the screw conveyor 37.

The best application of our discharger seems to be with respect to wet, low density, fibrous cakes such as are formed during the filtration of ground wood paper making pulp.

We claim:

1. In a continuous rotary drum filter, including a filter drum mounted for rotation on a horizontal axis and wherein a cake is formed and carried on the filter drum under the influence of an inwardly directed differential pressure; means for discharging said cake comprising: a discharge roll mounted parallel to and immediately adjacent the face of the filter drum on the descending side thereof for rotation in the same direction as the rotation of said filter drum, the function of said discharge roll being to cause the cake carried by the drum continuously to roll up upon itself in a direction opposite to the direction of rotation of the filter drum along the ascending and rear face of said discharge roll; and a discharge screw mounted over and parallel to said drum and immediately adjacent to the rear of said discharge roll for rotation in the same direction as the direction of rotation of the filter drum, the function of said screw being continuously to advance a portion of said cake along said screw.

2. A device for discharging a layer of wet, cohesive solids from the drum of a continuous rotary drum filter comprising: a discharge roll mounted immediately adjacent and parallel to the face of said drum for rotation in a clockwise direction assuming the drum to be also rotating in a clockwise direction, the function of said roll being to cause said layer of solids continuously to roll up upon itself along the ascending and rear face of said discharge roll; a discharge scroll mounted over and parallel to said drum immediately adjacent the rear of said discharge roll, the function of said scroll being continuously to advance a portion of said solids along said scroll; and means for delivering a fluid current between said drum and said discharge roll in a direction generally opposed to the direction of travel of said drum.

3. A device such as defined in claim 1, characterized in that the screw is in the form of a double scroll operating to advance the cut of solids which it takes partly to one end of the filter drum and partly to the other end of said drum.

HARRY W. DENHARD.
FRANK W. BRITTAIN.
ANTHONY G. SERPAS.

REFERENCES CITED

The following references are of record in the file of this patent:

UNITED STATES PATENTS

| Number | Name | Date |
|---|---|---|
| 1,288,433 | McCaskell | Dec. 17, 1918 |
| 1,812,648 | Gardella | June 30, 1931 |
| 1,914,742 | Hillier | June 20, 1933 |
| 2,027,652 | Raisch | Jan. 14, 1936 |
| 2,070,074 | Young | Feb. 9, 1937 |